United States Patent
Eriksson et al.

(10) Patent No.: US 6,385,449 B2
(45) Date of Patent: *May 7, 2002

(54) SYSTEM AND METHOD USED IN A MOBILE TELECOMMUNICATIONS NETWORK FOR LOAD BALANCING ONGOING CALLS BETWEEN DIFFERENT BASE STATION CONTROLLERS

(75) Inventors: Erik H. Eriksson, Linköping; Magnus Olsson, Sundbyberg; Anna Helleberg, Sollentuna, all of (SE); Ranjit Bhatia, Lewisville, TX (US)

(73) Assignee: Telefonaktiebolaget L M Ericsson, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,391

(22) Filed: Mar. 6, 1998

(51) Int. Cl.$^7$ ................................................. H04Q 7/20
(52) U.S. Cl. ..................... 455/436; 455/450; 455/453; 455/438
(58) Field of Search ................................ 455/436, 453, 455/450, 442, 443, 445, 440

(56) References Cited

U.S. PATENT DOCUMENTS

| | | | |
|---|---|---|---|
| 4,669,107 A | 5/1987 | Eriksson-Lennartsson ... | 379/60 |
| 4,670,899 A | 6/1987 | Brody et al. ................. | 379/60 |
| 5,175,867 A | 12/1992 | Wejke et al. ............... | 455/33.1 |
| 5,471,644 A * | 11/1995 | Schatz et al. ............... | 455/33.2 |
| 5,633,915 A | 5/1997 | Yang et al. .................... | 379/60 |
| 5,649,293 A | 7/1997 | Reed ........................... | 455/453 |
| 5,697,054 A | 12/1997 | Andersson ................. | 455/33.1 |
| 5,754,959 A * | 5/1998 | Ueno et al. .................. | 455/453 |
| 5,991,628 A * | 11/1999 | Pedziwiatr et al. ......... | 455/443 |
| 6,014,567 A * | 1/2000 | Ueno et al. .................. | 455/453 |
| 6,035,199 A * | 3/2000 | Barnett ........................ | 455/448 |
| 6,069,871 A * | 5/2000 | Sharma et al. ............... | 370/209 |
| 6,131,029 A * | 10/2000 | Roberts ....................... | 455/438 |

FOREIGN PATENT DOCUMENTS

| | | | |
|---|---|---|---|
| WO | 9535639 | 12/1995 | ............ H04Q/7/34 |

OTHER PUBLICATIONS

U.S. application No. 09/035,821, filed Mar. 6, 1998.
U.S. application No. 09/035,788, filed Mar. 6, 1998.
Dept. of Electrical Engineering, The University of British Columbia, 0–7803–3300–4/96, "Network Configurations for Seamless support of CDMA Soft Handoffs Between Cell–Clusters", Cheung et al., pp. 295–299.

(List continued on next page.)

Primary Examiner—Nay Maung
Assistant Examiner—Temica M. Davis
(74) Attorney, Agent, or Firm—Jenkens & Gilchrist; A Professional Corporation

(57) ABSTRACT

A method and system for load balancing used in a mobile telecommunications network. The load balancing system includes a mobile services switching center and a first base station controller coupled to the mobile services switching center for managing a first plurality of cells. The load balancing system further includes a second base station controller coupled to the mobile services switching center for managing a second plurality of cells, where one cell of the first plurality of cells is adjacent to one cell of the second plurality of cells. The second base station controller includes a processor responsive to receiving a first load indication message from the first base station controller in order to determine whether to handover at least one ongoing call from the one cell of the second base station controller to the one cell of the first base station controller.

29 Claims, 3 Drawing Sheets

OTHER PUBLICATIONS

IS–634 revision A—part 1 (IS–634. 1 rev. A) (PN–3539) 2nd Ballot Version—Draft for V&V, Part 1—Common Protocol and Part 5—Protocol Details, Oct. 27, 1997, Jones et al.

European Telecommunications Standard Institute; Draft pr ETS 300 974, Digital Cellular Telecommunications System (Phase 2+); Mobile Application Part (MAP) Specification (GSM 09.02 version 5.8.0), Feb. 1998.

ANSI–41–D (Former TIA/EIA IS–41–C), Cellular Radiotelecommunications Intersystem Operations, pp. 2–5, 2–14, 2–25–2–30.

* cited by examiner

SYSTEM AND METHOD USED IN A MOBILE TELECOMMUNICATIONS NETWORK FOR LOAD BALANCING ONGOING CALLS BETWEEN DIFFERENT BASE STATION CONTROLLERS

CROSS REFERENCE TO RELATED APPLICATIONS

This application is related to two U.S. applications filed on Mar. 6, 1998 in the name of Pontus Wallentin entitled "Telecommunications Inter-Exchange Measurement Transfer" Ser. No. 09/035,827 and "Telecommunications Inter-Exchange Congestion Control" Ser. No. 09/035,788; both of which are hereby incorporated by reference herein.

BACKGROUND OF THE INVENTION

1. Technical Field of the Invention

The present invention generally relates to a mobile telecommunications network and, in particular, to a system and method used in a mobile telecommunications network for load balancing ongoing calls between different base station controllers.

2. Description of Related Art

A mobile telecommunications network having an architecture according to the Global System for Mobile Communications (GSM) specification includes a multitude of cells. The cells effectively divide an arbitrary geographic area into a plurality of contiguous radio coverage areas; each of which is served by a base transceiver station (BTS). The BTS serves each cell by utilizing a limited number of traffic channels that are controlled by a base station controller (BSC). The BSC is generally used to supervise and control a group of the BTSs.

The BSC may have a feature known as "Cell Load Sharing" to increase the capacity and operating performance of the network by effectively balancing the ongoing call loads between the cells that are adjacent to one another. For example, at any time a particular cell may have a high ongoing call load, while adjacent cells have low ongoing call loads, thus triggering the "Cell Load Sharing" feature of the base station controller to balance the various call loads between the different cells. The BSC balances the various call loads by transferring some of the ongoing calls from the cell having the high ongoing call load to the adjacent cell(s) having the low ongoing call load. Of course, the ongoing call load for any cell is constantly changing due mainly to origination of new calls and handovers of calls from traveling mobile terminals.

However, the "Cell Load Sharing" feature currently used will operate only with respect to the cells or base transceiver stations that are controlled by one base station controller. Thus, if a cell associated with a different base station controller is adjacent to the cell controlled by another base station controller, then no balancing of the ongoing calls can be completed, because the required information is not communicated between the different base station controllers.

Accordingly, there is a need for a method and system used in a mobile telecommunications network for load balancing ongoing calls between adjacent cells controlled by different base station controllers. There is also a need for a system and method for transmitting load indication messages between different base station controllers. These and other needs are satisfied by the system and method of the present invention.

SUMMARY OF THE INVENTION

The present invention is a method and system for load balancing used in a mobile telecommunications network. The load balancing system includes a mobile services switching center and a first base station controller coupled to the mobile services switching center for managing a first plurality of cells. The load balancing system further includes a second base station controller coupled to the mobile services switching center for managing a second plurality of cells, where one cell of the first plurality of cells is adjacent to one cell of the second plurality of cells. The second base station controller includes a processor responsive to receiving a first load indication message from the first base station controller in order to determine whether to handover at least one ongoing call from the one cell of the second base station controller to the one cell of the first base station controller.

In accordance with the present invention, a system and method are provided for balancing an ongoing call load across a boundary between adjacent cells that are controlled by different base station controllers.

Also in accordance with the present invention, a system and method are provided that have a base station controller generating a load indication message whenever the number of available traffic channels within a cell changes so as to exceed or fall below a predetermined threshold.

Further in accordance with the present invention, a method and system are provided for utilizing a load indication message in a different and more advantageous manner than was intended by the GSM specification.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
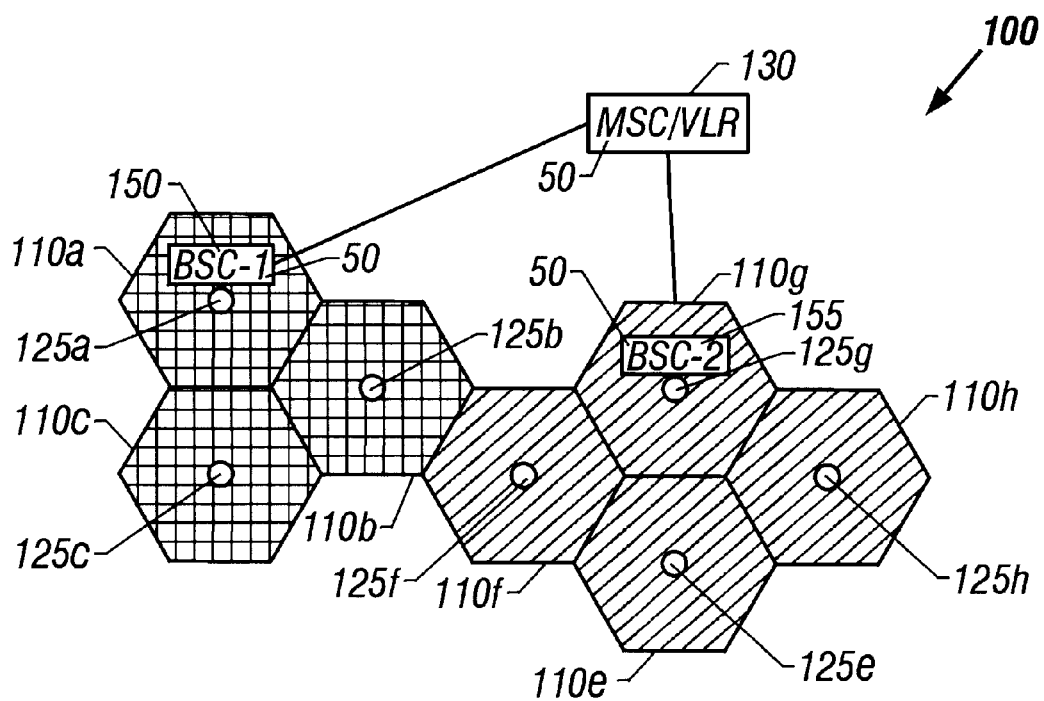
FIG. 1 is a block diagram of a mobile telecommunications network incorporating a load balancing system, in accordance with the present invention.
Figure 2:
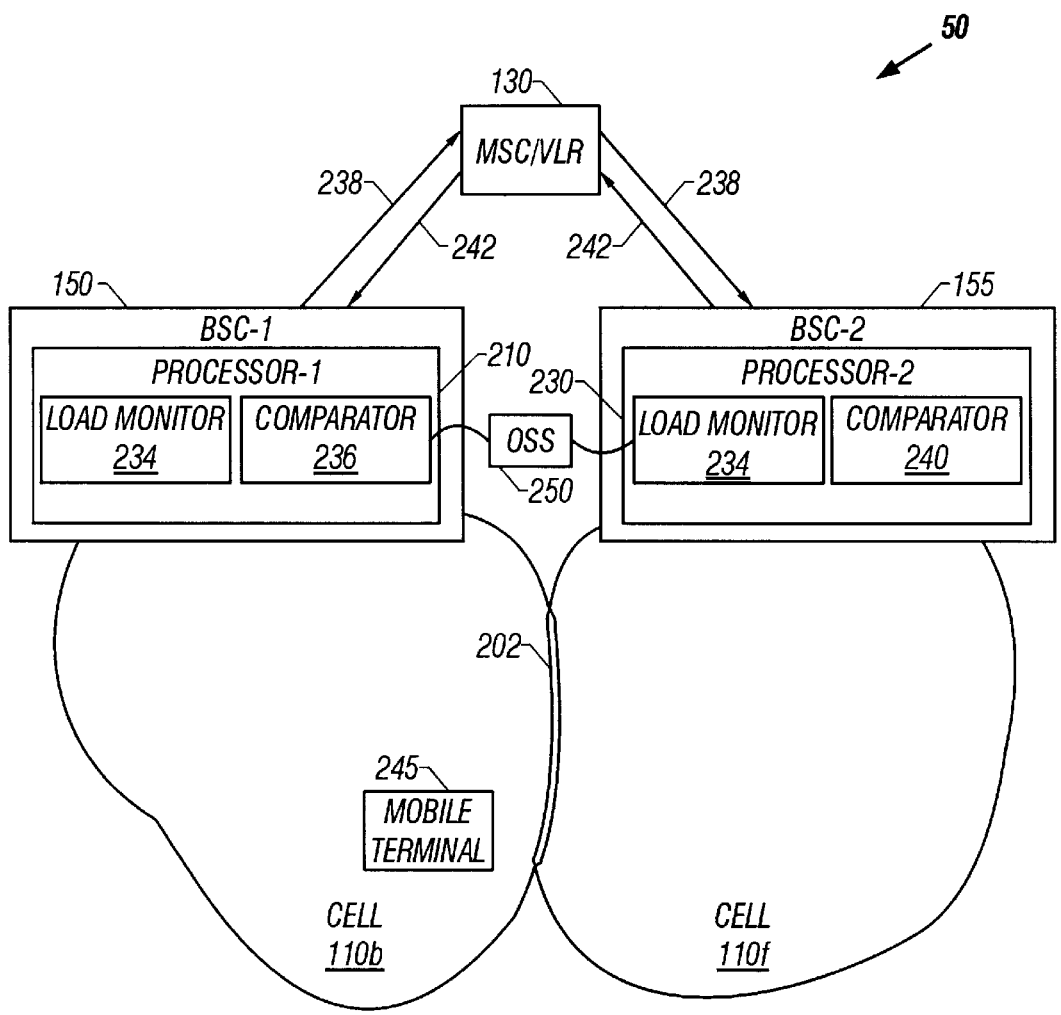
FIG. 2 is a block diagram illustrating in greater detail the load balancing system shown in FIG. 1.
Figure 3:
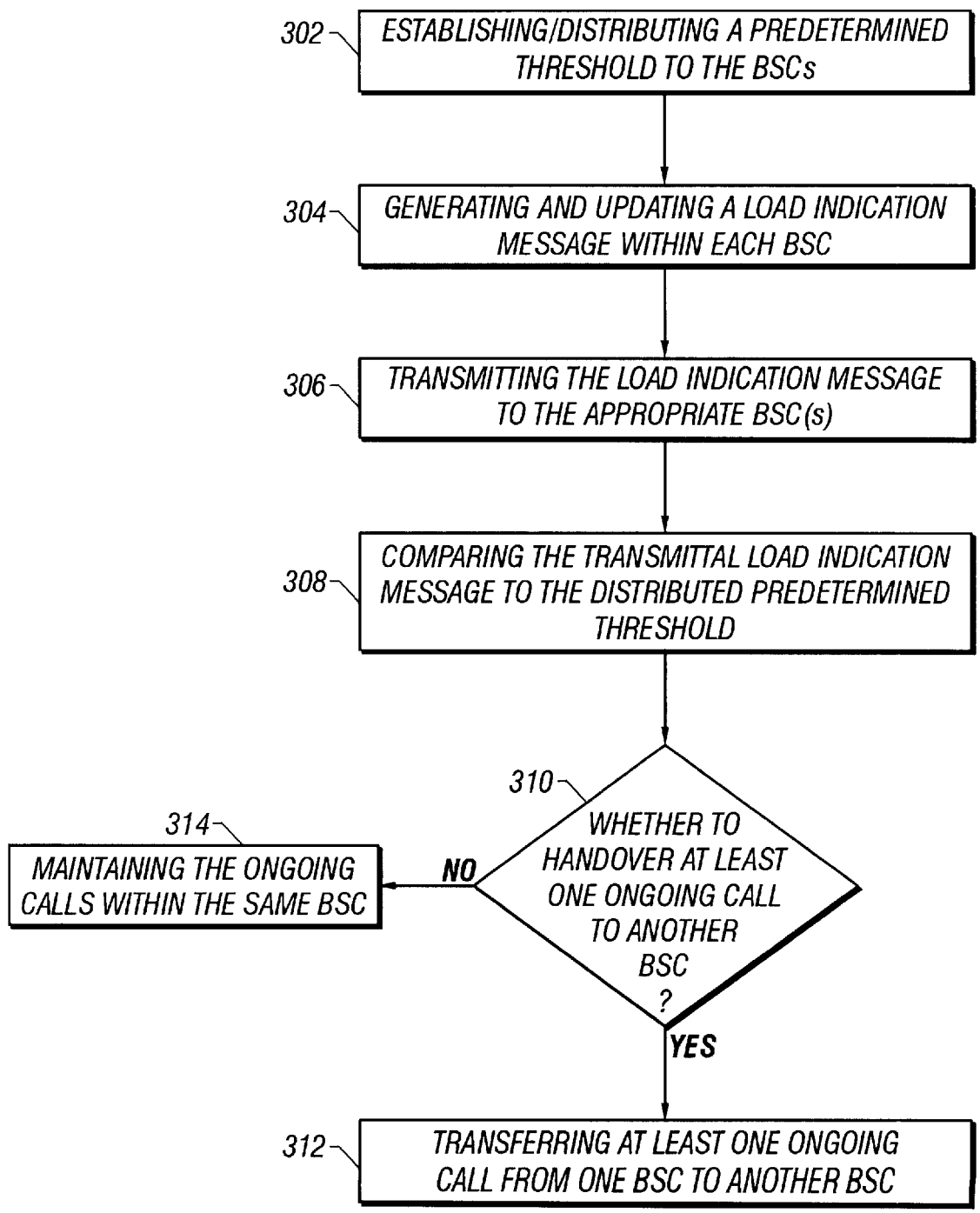
FIG. 3 is a simplified flow diagram of an operation of the load balancing system shown in FIG. 1.

Referring to the Drawings, wherein like numerals represent like parts throughout FIGS. 1–3, there is disclosed an exemplary load balancing system 50, which can be used to implement a preferred embodiment of the present invention.

Although a mobile telecommunications network 100 embodying the load balancing system 50 of the present invention will be discussed based on the Global System for Mobile Communications (GSM) specification, those skilled in the art will appreciate that the GSM specification is only one of many specifications and standards that may utilize the principles of the present invention. Accordingly, the load balancing system 50 described should not be construed in such a limiting manner.

Referring to FIG. 1, there is illustrated a block diagram of the mobile telecommunications network 100 incorporating the exemplary load balancing system 50. Excluding the load balancing system 50, the general architecture of the mobile telecommunication network 100 is based substantially on the GSM specification.

The mobile telecommunications network 100 includes a plurality of cells 110a–110h that effectively divide an arbitrary geographic area into a plurality of contiguous radio coverage areas. A single base transceiver station (BTS) 125a–125h consisting of transmitter and receiver antenna(s) (not shown) is positioned within each cell 110a–110h.

Different groups of neighboring cells (e.g., cells 110a–110c) are then associated with a particular base station controller (e.g., BSC-1 150). A number of BSCs (e.g., BSC-1 150 and BSC-2 155) may, in turn, be associated with a mobile services switching center/visitor location register (e.g., MSC/VLR 130). As an illustration, the BSC-1 150 provides mobile service for cells 110a–110c, while the BSC-2 155 provides mobile service for cells 110d–110h. The BSC-1 150 and BSC-2 155 are in turn coupled to the MSC/VLR 130, which generally functions as an interface between the mobile telecommunications network 100 and, for example, a public switched telephone network (PSTN) (not shown). The load balancing system 50 preferably includes the BSCs (e.g., BSC-1 150 and BSC-2 155) and the MSC/VLR 130, which are discussed in greater detail with reference to FIGS. 2–3.

Referring to FIG. 2, there is illustrated a block diagram of the exemplary load balancing system 50. The load balancing system 50 generally includes the MSC/VLR 130 coupled to the BSC-1 150 and the BSC-2 155 for balancing an ongoing call load in opposite directions across a boundary 202 between the adjacent cells 110b and 110f. The adjacent cells 110b and 110f are controlled by the BSC-1 150 and the BSC-2 155, respectively. For clarity, the description of the load balancing system 50 will include only two BSCs (e.g., BSC-1 150 and BSC-2 155) each having adjacent cells (e.g., cells 110b and 110f); however, the system may include any number of BSCs.

The BSC-1 150 includes a processor-1 210 for determining whether or not to handover at least one ongoing call from the cell 110b to the cell 110f, in view of the number of ongoing calls within the two cells. Likewise, the BSC-2 155 includes a processor-2 230 responsible for determining whether or not to handover at least one ongoing call from the cell 110f to the cell 110b. The BSC-1 150 and BSC-2 155 can further include conventional components, such as a regional processor, group switch and signaling terminal central, etc.

The reason for ordering a handover associated with load balancing is not to be confused with the traditional handover associated with a moving mobile terminal 245. For example, the traditional handover would be completed when the mobile terminal 245 travels from the cell 110b to the cell 110f, and the ongoing call is transferred to the cell 110f as the mobile terminal enters the cell 110f. Notably, the load balancing handover of the present invention may be completed for load balancing purposes to transfer the ongoing call from the cell 110b to the cell 110f even though the mobile terminal 245 remains within the cell 110b.

The processors 210 and 230 each include a load monitor 234 for continuously or periodically updating the number of traffic channels that are currently active and can not accept a new call or an ongoing call via a traditional handover procedure. The load monitor 234 may also periodically or continuously calculate a percentage of the active traffic channels with respect to a total number of traffic channels assigned to any one of the cells. The number of active traffic channels or the percentage described above may be referred to as a resource utilization number (RUN).

A comparator-1 236 incorporated within the processor-1 210 compares a predetermined threshold (described below) to the RUN associated with the cell 110b to determine if a load indication message-1 238 must be generated and transmitted via the MSC/VLR 130 to the BSC-2 155. The load indication message-1 238 is generated whenever the RUN (e.g., the number of active traffic channels) within the cell 110b changes so as to exceed or fall below a predetermined threshold. It should be noted that the load indication message-1 238 of the present invention is thus used in a different, more advantageous manner than was originally intended by the GSM standard.

For example, the load indication message-1 238 will not be generated if a prior RUN was below/above the predetermined threshold and the current resource utilization number is below/above the predetermined threshold, respectively. However, the load indication message-1 238 will be generated and transmitted to the BSC-2 155 whenever the prior RUN was below/above the predetermined threshold and the current RUN is above/below (e.g., opposite sides) the predetermined threshold, respectively.

Alternatively, the load indication message-1 238 may be periodically generated and transmitted to the BSC-2 155 during predetermined intervals of time without comparing the RUN associated with the cell 110b to the predetermined threshold. In such a case, the load indication message-1 238 would be comparable to the resource utilization number.

A comparator-2 240 is incorporated within the processor-2 230 to compare a predetermined threshold and the RUN associated with the cell 110f to determine if a load indication message-2 242 will be generated and transmitted via the MSC/VLR 130 to the BSC-1 150. The load indication message-2 242 is generated whenever the RUN within the cell 110h changes so as to exceed or fall below the predetermined threshold. As mentioned above, the load indication message-2 242 may be periodically generated and transmitted to the BSC-1 150 during predetermined intervals of time without comparing the RUN of the cell 110f to the predetermined threshold. Also, some of the load indication information could be included in messages transmitted using the traditional handover procedures.

Upon receiving the load indication message-2 242, the BSC-1 150 (and more specifically the processor-1 210) will determine whether to attempt transfer of at least one of the ongoing calls within the cell 110b to the cell 110f. The processor-1 210 will transfer or handover at least one of the ongoing calls when the RUN of the cell 110b is greater than a predetermined threshold and the BSC-2 155 can accept the ongoing call(s). The BSC-2 155 can accept the ongoing call(s) from the BSC-1 150 when the RUN of the cell 110f is below the predetermined threshold, otherwise, the BSC-2 may not accept the at least one ongoing call.

Similarly, the BSC-2 155 and the processor-2 230 upon receiving the load indication message-1 238 will determine whether to attempt a transfer of at least one of the ongoing calls within the cell 110f to the cell 110b associated with the BSC-1 150. The processor-2 230 will transfer or handover at least one of the ongoing calls when the RUN the cell 110f is greater than a predetermined threshold and the BSC-1 150 can accept the ongoing call(s). The BSC-1 150 can accept at least one of the ongoing calls from the BSC-2 155 when the RUN of the cell 110b is below the predetermined threshold; otherwise, the BSC-1 will not accept the ongoing call(s) from cell 110f.

The predetermined threshold is generally the same level for each of the BSCs 150 and 155, and may be submitted to the processors 210 and 230 via an operation and support system (OSS) 250. The OSS 250 may also change the levels of the predetermined threshold so that there is a different level for each cell 110b and 110f. Also, the predetermined threshold level may include an upper threshold and lower threshold to help assure that the RUN is stable above or below the respective threshold before generating the load indication message.

Referring to FIG. 3, there is illustrated a simplified flow diagram of a method of operation for the exemplary load balancing system 50. As discussed earlier, the operation of the load balancing system 50 may be performed within the mobile telecommunications network 100 based on the GSM specification. However, other specifications or standards may be used such as, for example, the Advanced Mobile Phone System (AMPS), the Digital Advanced Mobile Phone System (DAMPS) and the Personal Digital Cellular (PDC) System.

Beginning at step 302 of the preferred method, the OSS 250 establishes the predetermined threshold and distributes the predetermined threshold to the BSC-1 150 and the BSC-2 155 (FIG. 2). The predetermined threshold is generally the same level within each of the BSCs 150 and 155.

At step 304, the load indication messages (e.g., load indication message-1 238) are generated and updated within the respective BSCs (e.g., BSC-1 150) whenever the RUN within the corresponding cell (e.g., cell 110b) changes so as to exceed or fall below the predetermined threshold. Alternatively, the load indication messages (e.g., load indication message-1 238) may be periodically updated and generated during predetermined intervals of time, without comparing the RUN associated with the cells (e.g., cell 110b) to the predetermined threshold.

At step 306, each of the generated load indication messages (e.g., load indication message-1 238) are transmitted to the other BSCs (e.g, BSC-2 155). Then at step 308, each processor (e.g., processor-2 230) compares the received load indication messages (e.g., load indication message-1 238) to the predetermined threshold.

At step 310, a determination is made by each processor (e.g. processor-2 230) upon receiving the load indication message (e.g., load indication message-1 238) about whether to attempt a handover of at least one of the ongoing calls from one BSC (e.g., BSC-2 155) to the other BSC (e.g., BSC-1 150). The processor (e.g., processor-2 230), at step 312, will handover at least one of the ongoing calls when the RUN of the cell (e.g., cell 110f) is greater than a predetermined threshold, and the other BSC (e.g., BSC-1 150) can accept that ongoing call. Otherwise at step 314, the ongoing calls within the particular cell (e.g., cell 110f) will remain within that cell.

From the foregoing, it can be readily appreciated by those skilled in the art that the present invention provides a load balancing system and method for use in a mobile telecommunications network for distributing ongoing calls between adjacent cells controlled by different base station controllers. Also, the load balancing system as disclosed may be used to transmit load indication messages between different base station controllers.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A load balancing system used in a mobile telecommunications network comprising:
   a mobile services switching center;
   a first base station controller coupled to the mobile services switching center for managing a first plurality of cells;
   a second base station controller coupled to the mobile services switching center for managing a second plurality of cells, where one cell of the first plurality of cells is adjacent to one cell of the second plurality of cells, said second base station controller including:
      a processor responsive to receiving a first load indication message from the first base station controller for determining whether to handover at least one ongoing call from the one cell of the second base station controller to the one cell of the first base station controller.

2. The load balancing system of claim 1, wherein said first base station controller including a processor responsive to receiving a second load indication message from the second base station controller for determining whether to handover at least one ongoing call from the one cell of the first base station controller to the one cell of the second base station controller.

3. The load balancing system of claim 2, wherein said processor of the first base station controller includes means for generating the first load indication message whenever a number of active traffic channels within the one cell of the first base station controller changes such as to exceed or fall below a predetermined threshold.

4. The load balancing system of claim 1, wherein said processor of the second base station controller includes means for generating the second load indication message whenever a number of active traffic channels within the one cell of the second base station controller changes such as to exceed or fall below a predetermined threshold.

5. The load balancing system of claim 2, wherein said processor of the first base station controller includes means for periodically generating the first load indication message.

6. The load balancing system of claim 1, wherein said processor of the second base station controller includes means for periodically generating the second load indicating message.

7. The load balancing system of claim 2, wherein said processor of the first base station controller further includes means for transferring the at least one ongoing call to the one cell of the second base station controller when the number of active traffic channels of the one cell associated with the first base station controller is greater than a predetermined threshold and the second base station controller can accept the at least one ongoing call.

8. The load balancing station of claim 1, wherein said processor of the second base station controller further includes means for transferring the at least one ongoing call to the one cell of the first base station controller when the number of active traffic channels of the one cell associated with the second base station controller is greater than a predetermined threshold and the first base station controller can accept the at least one ongoing call.

9. The load balancing system of claim 2, wherein the processor of the first base station controller further includes a load monitor for updating the number of active traffic channels.

10. The load balancing system of claim 9, wherein the processor of the first base station controller further includes a comparator for comparing the updated number of active traffic channels to the predetermined threshold.

11. The load balancing system of claim 1, wherein the processor of the second base station controller further includes a load monitor for updating the number of active traffic channels.

12. The load balancing system of claim 11, wherein the processor of the second base station controller further includes a comparator for comparing the updated number of active traffic channels to the predetermined threshold.

13. A mobile telecommunications network comprising:
a switching center;
a first base station having at least one first cell, said first base station controller coupled to the switching center; and
a second base station controller having at least one second cell adjacent to the first cell of the first base station controller, said second base station controller coupled to the switching center and including:
a second processor for transmitting a message to the first base station controller whenever a resource utilization number of the second cell changes as to exceed or fall below a predetermined threshold, where the second base station controller can accept at least one ongoing call from the first base station controller when the resource utilization number of the second base station controller is less than the predetermined threshold.

14. The mobile telecommunications network of claim 13, wherein said first base station controller including a first processor for transmitting a message to the second base station controller whenever a resource utilization number of the first cell changes as to exceed or fall below the predetermined threshold, where the first base station controller can accept at least one ongoing call from the second base station controller when the resource utilization number of the first base station controller is less than the predetermined threshold.

15. The mobile telecommunications network of claim 14, further comprising an operations and support system for submitting the predetermined threshold to the first processor and the second processor.

16. The mobile telecommunications network of claim 14, wherein said first processor includes means responsive to the transmitted message from the second base station controller for transferring the at least one ongoing call of the first cell to the second cell of the second base station controller when the resource utilization number of the first cell is greater than a predetermined threshold and the second base station controller can accept the at least one ongoing call from the first base station controller.

17. The mobile telecommunications network of claim 13, wherein said second processor includes means responsive to the transmitted message from the first base station controller for transferring the at least one ongoing call of the second cell to the first cell of the first base station controller when the resource utilization number of the second cell is greater than the predetermined threshold and the first base station controller can accept the at least one ongoing call from the second base station controller.

18. The mobile telecommunications network of claim 14, wherein the resource utilization number includes a number of active traffic channels.

19. The mobile telecommunications network of claim 14, wherein the resource utilization number includes a number of active traffic channels divided by a total number of traffic channels.

20. The mobile telecommunications network of claim 14, wherein the first and second processors each include a load monitor for updating the resource utilization number of the first cell and the second cell, respectively.

21. The mobile telecommunications network of claim 20, wherein the first and second processors each include a comparator for comparing the respective updated resource utilization number to the predetermined threshold.

22. A method used in a mobile telecommunications network for sharing loads between a first base station controller having at least one first cell and a second base station controller having at least one second cell adjacent to the first cell, said method comprising the steps of:
establishing and distributing a predetermined threshold to the first and second base station controllers;
generating a first load indication message within the first base station controller;
transmitting the first load indication message to the second base station controller; and
comparing the transmitted first load indication message to the distributed predetermined threshold to determine whether to handover at least one ongoing call from the second cell of the second base station controller to the first cell of the first base station controller.

23. The method of claim 22, further comprising the steps of:
generating a second load indication message within the second base station controller;
transmitting the second load indication message to the first base station controller; and
comparing the transmitted second load indication message to the distributed predetermined threshold to determine whether to handover at least one ongoing call from the first cell of the first base station controller to the second cell of the second base station controller.

24. The method of claim 22, wherein the step of generating a first load indication message includes updating the first load indication message whenever a number of active traffic channels within the first cell changes such as to exceed or fall below the predetermined threshold.

25. The method of claim 22, wherein the step of generating a first load indication message includes updating the first load indication message on a periodic basis.

26. The method of claim 23, wherein the step of generating a second load indication message includes updating the second load indication message whenever a number of active traffic channels within the second cell changes such as to exceed or fall below the predetermined threshold.

27. The method of claim 23, wherein the step of generating a second indication message includes periodically updating the second load indication message.

28. The method of claim 22, wherein the step of comparing the transmitted first load indication message further includes transferring the at least one ongoing call to the first cell when the number of active traffic channels of the second cell associated with the second base station controller is greater than the predetermined threshold and the first base station controller can accept the at least one ongoing call.

29. The method of claim 23, wherein the step of comparing the transmitted second load indication message further includes transferring the at least one ongoing call to the second cell when the number of active traffic channels of the first cell associated with the first base station controller is greater than the predetermined threshold and the second base station controller can accept the at least one ongoing call.

* * * * *

UNITED STATES PATENT AND TRADEMARK OFFICE
CERTIFICATE OF CORRECTION

PATENT NO. : 6,385,449 B2  
DATED : May 7, 2002  
INVENTOR(S) : Eriksson et al.

It is certified that error appears in the above-identified patent and that said Letters Patent is hereby corrected as shown below:

<u>Drawings,</u>  
Fig. 2, Element 236, delete "COMPARATOR" and insert -- COMPARATOR-1 --.  
Fig. 2, Element 240, delete "COMPARATOR" and insert -- COMPARATOR-2 --.

<u>Column 2,</u>  
Line 41, delete "DRAWINGS" and insert -- INVENTION --.

<u>Column 3,</u>  
Line 8, delete "110*d*" and insert -- 110*e* --.

<u>Column 4,</u>  
Line 27, delete "110*h*" and insert -- 110*f* --.  
Line 51, after "RUN" insert -- of --.

Signed and Sealed this

Third Day of December, 2002

JAMES E. ROGAN  
*Director of the United States Patent and Trademark Office*